Figure 1:
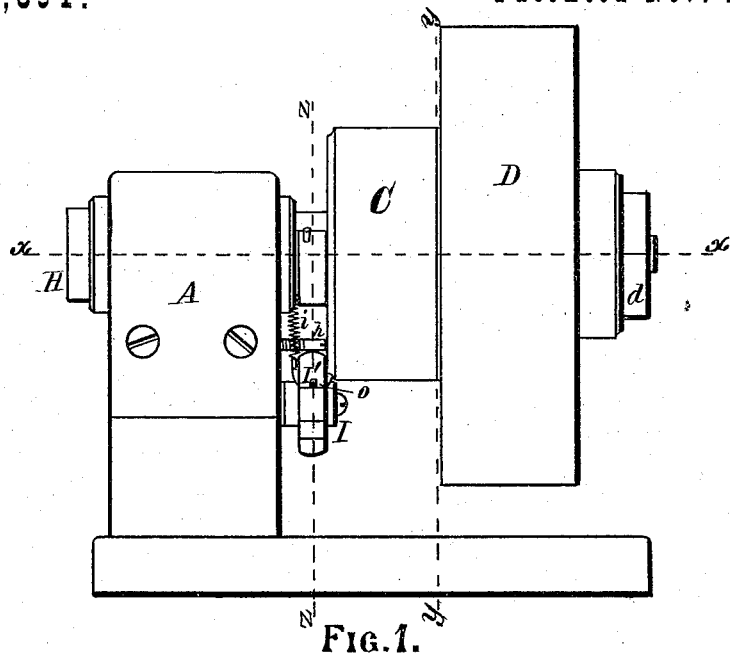

2 Sheets—Sheet 1.

B. F. YOUNG.
CLUTCH.

No. 169,394.      Patented Nov. 2, 1875.

WITNESSES.
N. C. Lombard
E. A. Hemmenway

INVENTOR.
Benj<sup>a</sup>. F. Young

2 Sheets—Sheet 2.

B. F. YOUNG.
CLUTCH.

No. 169,394. Patented Nov. 2, 1875.

WITNESSES.
N. C. Lombard
E. A. Hemmenway

INVENTOR.
Benj.ᵃ F. Young

UNITED STATES PATENT OFFICE.

BENJAMIN F. YOUNG, OF BOSTON, MASSACHUSETTS.

IMPROVEMENT IN CLUTCHES.

Specification forming part of Letters Patent No. 169,394, dated November 2, 1875; application filed October 12, 1875.

*To all whom it may concern:*

Be it known that I, BENJAMIN F. YOUNG, of Boston, in the county of Suffolk and State of Massachusetts, have invented certain new and useful Improvements in Clutches, of which the following, taken in connection with the accompanying drawings, is a specification:

My invention relates to the operative devices for causing a loose pulley or other wheel to engage with its shaft, and for disengaging the same therefrom; and it consists, first, in forming in the end of one of the hubs of the pulley or other wheel, which it is desirable to engage with, or disengage from, its shaft at pleasure, an annular recess of suitable depth, in the outer circumference of which is formed a curved enlargement, in combination with a dog or pawl, secured to or formed upon the end of a shaft having its bearing in a collar formed upon or firmly secured to the shaft upon which the pulley or other wheel revolves, said pawl-shaft being located eccentrically and parallel to the main shaft, and having formed upon or secured to its other end a short lever or radius arm, by which said shaft may be oscillated about its axis, against the tension of a spring connected therewith, to disengage the end of the pawl or dog from contact with the pulley or other wheel by swinging it out of said enlargement of the annular recess formed in the hub of the pulley, and into a position with its sides concentric to the axis of the main shaft.

My invention further consists in the use, in combination, of an annular recess having a curved enlargement in its outer circumference, formed in the end of one of the hubs of the pulley, gear, or other wheel, through which the shaft is to be driven, a pawl or dog having its engaging end curved to correspond to the curve of the enlargement of said annular recess when its heel rests against the periphery of the shaft, and having its outer side and a portion of its inner side so formed that when the latter rests against the periphery of the shaft, and the engaging end is swung out of the enlargement of the annular recess, the outer surface of said pawl shall be concentric to the axis of the pulley, and present no impediment to its free revolution upon its shaft, said pawl being formed upon or secured to one end of a shaft having its bearing in a collar upon the main shaft, in a position outside of the periphery of the main shaft, but parallel to it, said pawl-shaft being provided with a spring to move in one direction and a lever or radius arm to engage with a removable stop to move it in the other direction.

My invention further consists in making the removable stop, which disengages the dog from the pulley or other wheel, in two parts, one sliding into the other, with a spring tending to throw them apart, so that the shoulder or abutment against which the radius-arm strikes shall yield slightly to the impact of the blow, and then react, overcoming the tension of the spring on the pawl-shaft and causing the inner surface of the forward end of the pawl to hug closely to the periphery of the main shaft.

My invention further consists in lining the portion of the enlargement of the annular recess with which the pawl engages with hardened steel, as will be described.

Figure 2:
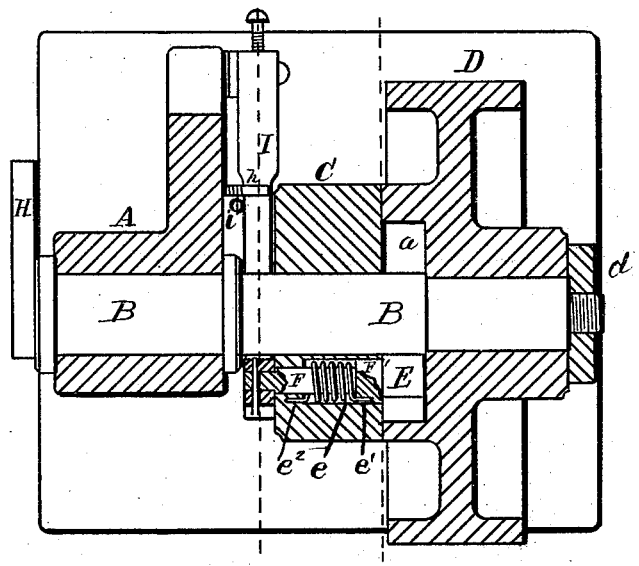
Figure 3:
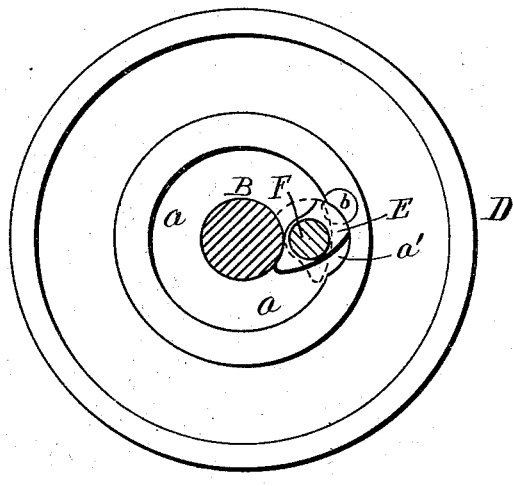
Figure 3:
Figure 6:
Figure 5:
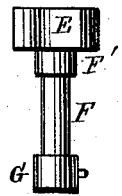
Figure 4:
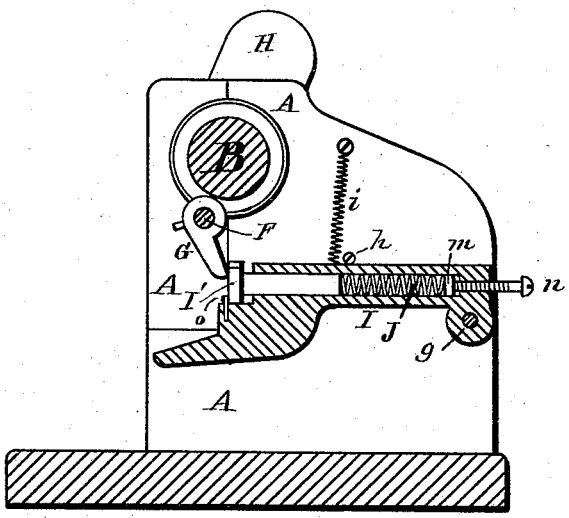

Figure 1 of the drawings is a side elevation of my improved clutch. Fig. 2 is a horizontal section on line $x\,x$ on Fig. 1. Fig. 3 is a vertical section on line $y\,y$ on Fig. 1, looking toward the pulley. Fig. 4 is a vertical section on line $z\,z$ on Fig. 1, looking toward the pillow-block, and Figs. 5 and 6 are, respectively, a plan and an end view of the pawl, pawl-shaft, and radius-arm, connected together, but detached from the other parts, and showing their relative positions to each other.

In the drawings, A is a pillow-block or bearing, in which is mounted a shaft, B, to which it is desired to impart an intermittent rotary motion for the purpose of operating the plunger of a punching or embossing press, or for other purposes. The shaft B is provided with a collar, C, which may be formed thereon, though I prefer to make it separate, and secure it firmly to said shaft by a key and keyway, or a pin passing through said collar and shaft. D is a pulley fitted to the shaft B so as to revolve freely thereon, with one end of its hub in contact, or nearly so, with the radial face of the collar C, and having formed in the end of its hub, contiguous to the collar C, an annular recess, $a$, surrounding the shaft B, and having a curved enlargement, a', formed in its outer circumference, as shown in Fig. 3. A steel pin, b, is set in the hub of said pulley, with its inner side cut away to conform to the circle of the enlargement a' of the annular recess a, said pin being set in such a position that the end of the pawl E will bear against it when it engages with the pulley D, as shown in Fig. 3, the inner or concave face of said steel pin being hardened to resist wear. The pulley D is kept in place on the shaft B by the collar C, upon one side, and the nut d, or any other suitable means upon the other. F is a short shaft, having an enlargement, F', formed thereon near one end, and having formed upon or secured to the same end a pawl or dog, E, and upon the opposite end of said shaft there is firmly secured the short lever, radius-arm, or dog G, the distance between the pawl E and dog G being just equal to the longitudinal thickness of the collar C, in which the shaft F has its bearing in a position just outside of the periphery of the shaft B and parallel therewith. The pawl E and dog G are arranged upon the shaft F relative to each other, as shown in Fig. 6, and the pawl E is shaped as shown in the same figure and in Fig. 3, its engaging end being concentric with its axis, its inner surface being formed of three curves, the center portion being concentric with its axis, and of a radius equal to the distance from the center of the shaft F to the periphery of the shaft B, and the portions upon either side of said center portion forming arcs of circles tangent to the said central surface, but curved in the opposite direction, and of a radius equal to the semi-diameter of the shaft B, the heel portion of said inner surface being cut away, so that when it is brought into contact with the shaft the opposite end of said pawl will assume the position shown in full lines in Fig. 3, and engage with the curved enlargement a' of the annular recess a formed in the pulley D. The outer longitudinal surface of the pawl E is so shaped as to be concentric with the axis of the shaft B when said pawl is thrown into the position indicated in dotted lines in Fig. 3. A coiled spring, e, surrounds the central portion of the shaft F, one end of which is made fast to said shaft at $e^1$, and the other end to the collar C at $e^2$, as shown in Fig. 2, the tension of said spring tending to rotate the shaft F in its bearing in the direction of the arrow f, and cause the heel of the pawl E to bear against the shaft B, as shown in Fig. 3, under which condition the pulley D, in its revolutions, will carry with it the shaft B, collar C, pawl E, shaft F, dog G, and the crank H, secured to the end of the shaft B, through which motion may be imparted to the mechanism that it is desired to operate thereby.

If an obstruction is thrown in the path of the revolution of the dog G as it moves around the shaft B, the shaft F will be partially rotated about its axis in a direction the reverse of that indicated by the arrow f, the pawl E will assume the position indicated by dotted lines in Fig. 3, releasing the pulley D from connection with the shaft B, and allowing said pulley to continue its revolutions, while the shaft B, its collar C, and the pawl E, shaft F, and dog G, remain in a state of rest.

I is a lever, pivoted at g to some suitable fixed portion of the machine, and held up against a stop-pin, h, by the spring i, as shown in Fig. 4. I' is a movable abutment, fitted to a bearing in the lever I, with its inner end bearing against a spring, J, the rear end of which rests against a washer, m, which, in turn, rests against and is acted upon by the set-screw n, by which the tension of the spring J may be regulated at will. The abutment I' is prevented from turning in its socket by the lower portion of its outer end being made square-cornered, and resting upon the flat upper surface of the lever I, and is also prevented from being thrown out of its socket by the pressure of the spring J by means of the pin o. The spring J should be slightly more powerful than the spring e.

The object of the yielding abutment I' is that when placed in position, as shown in Fig. 4, in the path of revolution of the dog G, it shall yield slightly to the impact of the dog G when the shaft is running at a high speed, and thereby materially reduce the shock to the parts caused by so suddenly arresting the revolution of the shaft, and then, by its reaction upon the dog G, cause the front end of the pawl E to hug closely to the shaft B, in position as indicated in dotted lines in Fig. 3, with a clear space between its outer surface and the outer circumference of the annular recess a, so that the pulley D may revolve freely without danger of touching it.

The lever I may be connected in any suitable manner to a treadle or hand-lever, by which it may be pulled down out of the path of the dog G when it is desired to have the pulley D engage with the shaft B to revolve it.

What I claim as new, and desire to secure by Letters Patent of the United States, is—

1. The shaft F, pawl E, dog G, and spring e, in combination with the shaft B, collar C thereon, and the driving-pulley D, or other wheel, having the annular recess a and curved enlargement a' thereof, formed in the end of one of its hubs, all constructed, arranged, and adapted to operate as and for the purposes described.

2. The combination of the shaft B, provided with the collar C, a driving-pulley or other wheel, D, provided with an annular recess, a, having upon one side thereof the curved enlargement a', the pawl E, shaft F, dog G, spring e, and the lever I, provided with a shoulder or abutment to engage with the dog G, and adapted to be withdrawn from the path of said dog, as and for the purposes described.

3. The lever I, provided with the movable abutment I', and the spring J, in combination with the pawl E, shaft F, spring e, and dog G, arranged and adapted to operate as and for the purposes set forth, as a means of causing an engagement or disengagement between the driving-wheel and its shaft, substantially as described.

4. The hardened steel pin $b$, set in the end of the hub of the driving-wheel D, and forming a portion of the curved enlargement $a'$ of the annular recess $a$, as and for the purposes described.

Executed at Boston this 9th day of October, 1875.

BENJA. F. YOUNG.

Witnesses:
N. C. LOMBARD,
E. A. HEMMENWAY.